(12) United States Patent
Shimizu

(10) Patent No.: US 9,491,320 B2
(45) Date of Patent: Nov. 8, 2016

(54) IMPACT REDUCTION DEVICE AND IMAGE FORMING APPARATUS

(71) Applicant: Keiichi Shimizu, Kanagawa (JP)

(72) Inventor: Keiichi Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/844,020

(22) Filed: Sep. 3, 2015

(65) Prior Publication Data

US 2016/0097231 A1 Apr. 7, 2016

(30) Foreign Application Priority Data

Oct. 2, 2014 (JP) .................................. 2014-204088

(51) Int. Cl.
*H04N 1/04* (2006.01)
*H04N 1/00* (2006.01)

(52) U.S. Cl.
CPC ...... *H04N 1/00549* (2013.01); *H04N 1/00559* (2013.01)

(58) Field of Classification Search
CPC .......... B65H 2701/1311; B65H 1/266; B65H 2220/02; B65H 2405/332; B65H 2601/11; B65H 31/22; B65H 23/34; B65H 2402/441; B65H 2402/46; B65H 2404/1442; B65H 2404/6111; B65H 2405/3322; B65H 2511/514
USPC .............. 271/264, 3.14, 10.11, 113, 162, 18, 271/207, 220, 225, 256, 258.01, 259, 271/265.02, 287, 291, 295, 301, 3.01, 3.19, 271/4.1; 358/1.13, 1.14, 1.1, 1.9, 296, 504
See application file for complete search history.

(56) References Cited

U.S. PATENT DOCUMENTS

| | | | | |
|---|---|---|---|---|
| 5,822,648 A * | 10/1998 | Mohri | ................. | G03G 15/161 399/302 |
| 5,854,965 A * | 12/1998 | Kasiwabara | ........... | B65H 29/60 399/110 |
| 7,384,038 B2 * | 6/2008 | Murai | ................... | B65H 31/02 271/207 |
| 9,010,749 B2 * | 4/2015 | Mizuno | ................... | B65H 1/00 271/145 |
| 2004/0112731 A1 * | 6/2004 | Shimizu | ............... | H01H 23/164 200/339 |
| 2006/0178185 A1 * | 8/2006 | Weis | ......................... | A63F 1/18 463/13 |
| 2006/0268376 A1 * | 11/2006 | Kawashima | ............. | H04N 1/00 358/498 |
| 2007/0098441 A1 * | 5/2007 | Oohata | .............. | G03G 21/1638 399/122 |
| 2008/0252922 A1 * | 10/2008 | Ikegami | ................ | H04L 63/083 358/1.15 |
| 2008/0253802 A1 * | 10/2008 | Koyanagi | .............. | G03G 15/16 399/114 |
| 2010/0239304 A1 * | 9/2010 | Sato | .................... | G03G 21/1652 399/90 |

(Continued)

FOREIGN PATENT DOCUMENTS

JP 2011-042453 3/2011

*Primary Examiner* — Negussie Worku
(74) *Attorney, Agent, or Firm* — Harness, Dickey & Pierce, P.L.C.

(57) ABSTRACT

An impact reduction device includes a pressing mechanism in an open-close device to press a first member in a direction in which the first member returns to an initial state. The open-close device includes the first member independently rotatable around a shaft from the initial state to a first angle, and a second member integrally rotatable with the first member around the shaft from the initial state to a second angle greater than the first angle. The pressing mechanism presses the first member in the direction in which the first member returns to the initial state using a first force until the first angle is reached, and presses the first member in the direction in which the first member together with the second member returns to the initial state using a second force greater than the first force between the first angle and the second angle.

4 Claims, 7 Drawing Sheets

(56) References Cited

U.S. PATENT DOCUMENTS

| | | | | |
|---|---|---|---|---|
| 2010/0301748 A1* | 12/2010 | Sakai | ............... | F21K 9/135 315/50 |
| 2011/0044704 A1* | 2/2011 | Uehara | ............... | G03G 15/6529 399/21 |
| 2014/0291927 A1* | 10/2014 | Nakahata | ............... | B65H 85/00 271/272 |
| 2014/0294406 A1* | 10/2014 | Eguchi | ............... | G03G 15/706 399/22 |
| 2015/0329305 A1* | 11/2015 | Shimizu | ............... | B41J 3/46 271/314 |

* cited by examiner

IMPACT REDUCTION DEVICE AND IMAGE FORMING APPARATUS

CROSS-REFERENCE TO RELATED APPLICATION

This patent application is based on and claims priority pursuant to 35 U.S.C. §119 to Japanese Patent Application No. 2014-204088, filed on Oct. 2, 2014, in the Japan Patent Office, the entire disclosure of which is hereby incorporated by reference herein.

BACKGROUND

1. Technical Field

Exemplary aspects of the present invention relate to an impact reduction device and an image forming apparatus.

2. Related Art

Most image forming apparatuses include a member, such as a cover or a door, which can be opened and closed so that a user can replace paper or another consumable item or fix paper jams. In such an image forming apparatus, a force is applied to open and close the cover or the door. Since such a force varies depending on the user, an impact reduction device is disposed to reduce impact generated when the cover or the door is opened and closed. The impact reduction device reduces the impact of opening and closing to within a permissible range.

SUMMARY

In at least one embodiment of this disclosure, there is provided an improved impact reduction device including an open-close device and a pressing mechanism. The open-close device includes a first member configured to independently rotate around a shaft from an initial state to a predetermined first angle with respect to a housing. The open-close device also includes a second member capable of rotating together with the first member around the shaft from the initial state to a second angle greater than the first angle with respect to the housing. The pressing mechanism is disposed in the open-close device to press the first member in a direction in which the first member returns to the initial state when the first member is in an open state. The pressing mechanism presses the first member in the direction in which the first member returns to the initial state using a predetermined first force until the first angle is reached. The pressing mechanism presses the first member in a direction in which the first member together with the second member returns to the initial state using a second force greater than the first force between the first angle and the second angle.

In at least one embodiment of this disclosure, there is provided an improved image forming apparatus including a housing, an image formation unit disposed in the housing to form an image on a recording medium, and the above-described impact reduction device.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
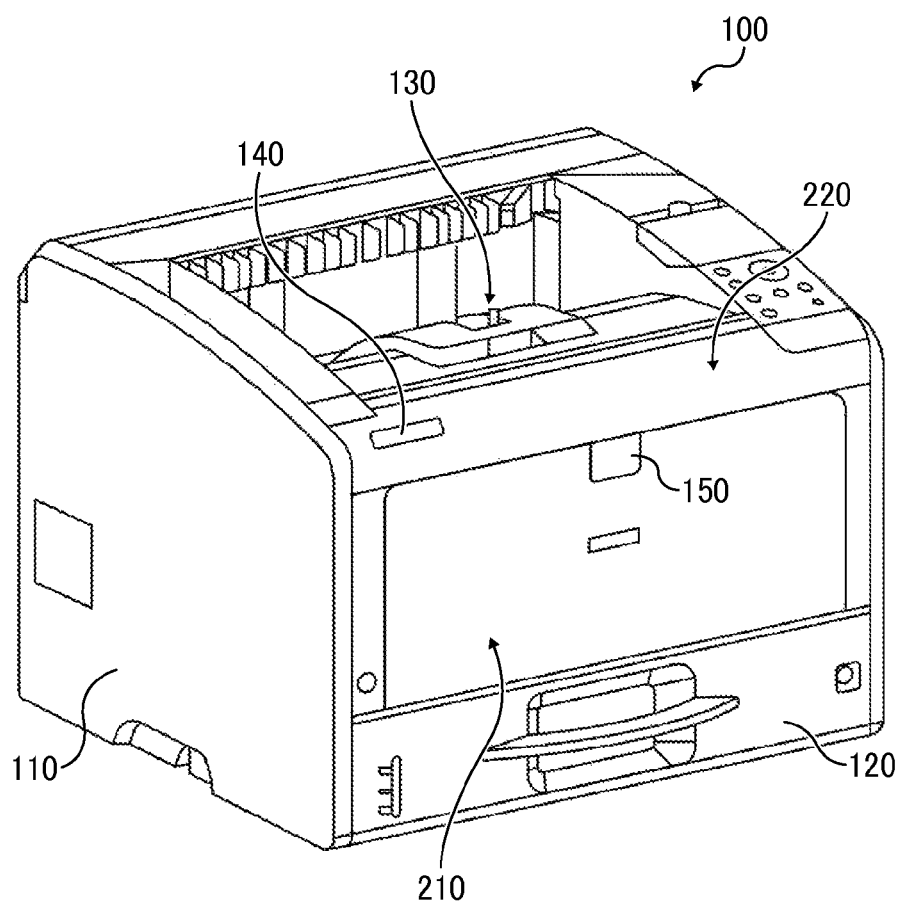
FIG. 1 is a perspective view of an image forming apparatus employing an impact reduction device according to one exemplary embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Referring now to the drawings, exemplary embodiments of the present disclosure are described below. In the drawings for explaining the following exemplary embodiments, the same reference codes are allocated to elements (members or components) having the same function or shape and redundant descriptions thereof are omitted below.

Some related-art image forming apparatuses include an open-close device including a plurality of members that rotate around a common shaft. In such an open-close device, for example, an impact reduction device with a compression spring can be shared. This can achieve space saving, cost reduction by reducing the number of components, and product weight reduction. However, in a case where a single impact reduction device adjusted to a load of one cover is used to reduce impact of a plurality of covers each having a different necessary load, parts of the other cover may be damaged or one of the covers may not be fully opened. Consequently, in general, an impact reduction device dedicated to each member is necessary. This increases the space needed for the impact reduction devices, and the number of components cannot be reduced.

By contrast, according to exemplary embodiments of the present invention, a single impact reduction device can reduce impact generated when two members configured to independently rotate around a common shaft are opened, thus saving space and reducing costs, weight, and number of components.

Hereinafter, an impact reduction device 500 and an image forming apparatus 100 according to an exemplary embodiment of the present invention are described.

First, a description is given of the image forming apparatus 100 employing the impact reduction device 500 according to one exemplary embodiment of the present invention. FIG. 1 is a perspective view of the image forming apparatus 100. The image forming apparatus 100 includes an image formation unit 15 inside an apparatus housing 110. The image formation unit 15 can be, for example, a known image formation unit or an electrophotographic image formation unit. The image forming apparatus 100 uses the image formation unit 15 to form an image on a sheet serving as a recording medium fed from a sheet feed tray 120, and ejects the sheet with the image to an ejection tray 130.

Moreover, the image forming apparatus 100 includes a first door 210 and a second door 220 that together constitute an open-close device. The first door 210 serving as a first member and the second door 220 serving as a second member are independently rotatable around a common shaft in a lower portion on the front side of the housing 110.

Figure 9:
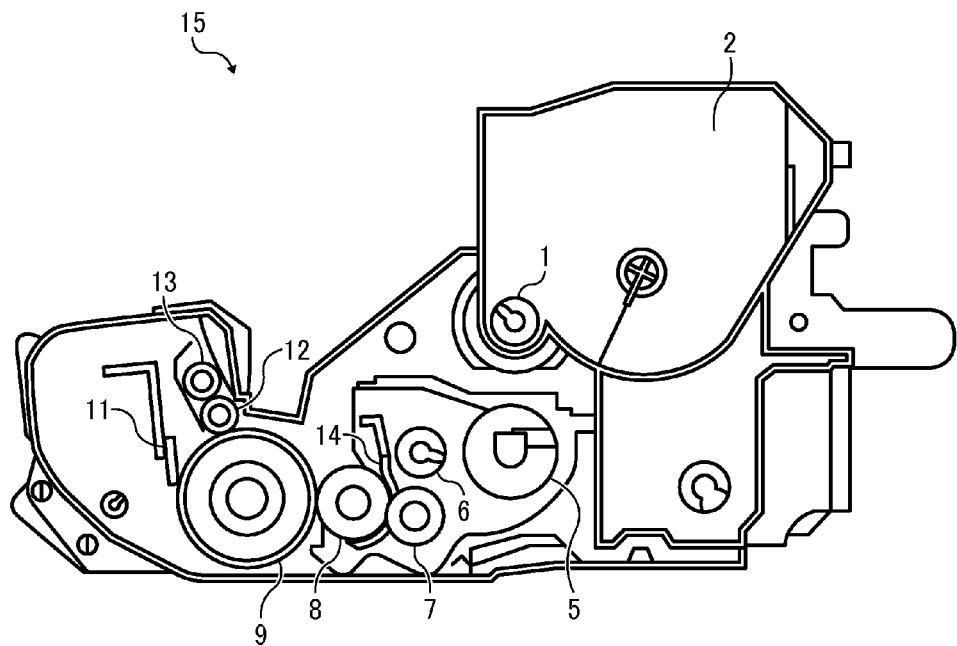
FIG. 9 is a diagram of an image formation unit of the image forming apparatus.

FIG. 9 illustrates the image formation unit 15 of the image forming apparatus 100. When a toner supply clutch is activated, a toner supply screw 1 inside a toner box 2 rotates. The rotation of the toner supply screw 1 conveys toner to a box port, so that the toner is provided into a process unit. Then, the toner is conveyed from the process unit to a developing unit with rotation of a first agitation screw 5. The first agitation screw 5 moves the toner to the left side in FIG. 9, whereas a second agitation screw 6 moves the toner to the right side. A toner supply roller 7 supplies the toner to a developing roller 8. The toner supply roller 7 and the developing roller 8 serve as an agitation unit, so that the toner is circulated and uniformed. A developing device includes the developing roller 8, the toner supply roller 7, and a developer blade 14. The developing device enables the toner to adhere to a surface of a photoconductor drum 9 to develop an electrostatic latent image into a toner image. The developer blade 14 regulates a thickness of a toner layer formed on a surface of the developing roller 8 to be substantially uniform. A charging roller 12 is rotated with the rotation of the photoconductor drum 9, thereby uniformly charging a surface of the photoconductor drum 9. However, in a case where the surface of the charging roller 12 has, for example, a toner stain, charging unevenness may occur on the surface of the photoconductor drum 9. A charging cleaning roller 13 contacts the charging roller 12 to clean the surface of the charging roller 12. A photoconductor cleaning blade 11 collects a residual transfer toner from the photoconductor drum 9. The photoconductor cleaning blade 11 is disposed in a direction opposite with respect to the rotation direction of the photoconductor drum 9. The photoconductor cleaning blade 11 contacts the photoconductor drum 9 to remove a residual toner from the surface of the photoconductor drum 9.

Figure 2:
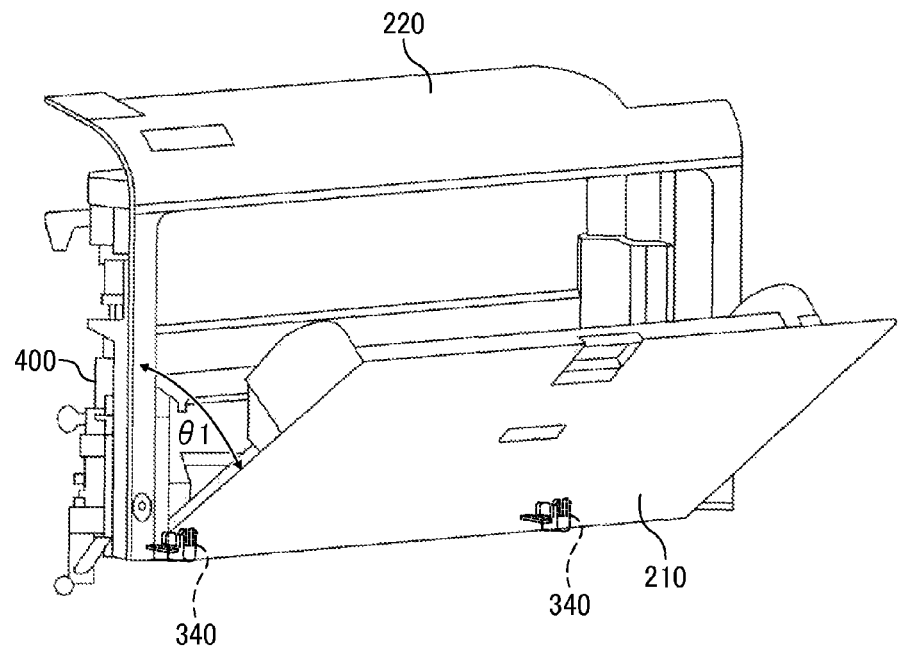
FIG. 2 is a perspective view of a state in which a first door of the image forming apparatus is independently opened.
Figure 3:
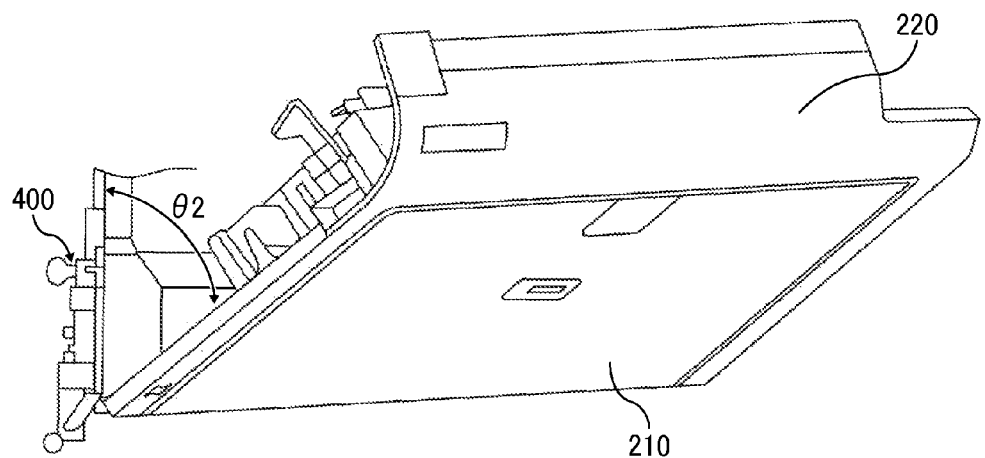
FIG. 3 is a perspective view of a state in which the first door and a second door of the image forming apparatus are opened together.

FIG. 2 is a perspective view of a state in which the first door 210 of the image forming apparatus 100 is independently opened, and FIG. 3 is a perspective view of a state in which the first door 210 and the second door 220 of the image forming apparatus 100 are opened together. The first door 210 is independently rotatable to a predetermined first angle $\theta 1$ (see FIG. 2) that is needed for manual paper feed. The second door 220 is integrated with the first door 210 and then rotatable to a second angle $\theta 2$ (see FIG. 3) that is greater than the first angle $\theta 1$, so that a consumable item inside the housing 110 can be replaced. The first door 210 and the second door 220 are rotatable around the common shaft disposed in the lower portion. Moreover, the first door 210 is smaller than the second door 220. The second door 220 covers an opening provided on the front side of the housing 110 such that the opening can be opened and closed.

As illustrated in FIG. 1, the first door 210 is usually closed with respect to the second door 220 by a first door fixing unit 150, that is, the first door 210 is usually held in an initial state. When sheets are manually fed, the first door fixing unit 150 is released, so that the first door 210 is pulled out and opened to the first angle $\theta 1$ (an open state) as illustrated in FIG. 2. The sheets are fed one by one along the first door 210 being in the open state. Moreover, the second door 220 is usually closed with respect to the housing 110 by a second door fixing unit 140, that is, the second door 220 is usually held in an initial state. When a consumable item of a device such as the developing device and the photoconductor drum 9 inside the housing 110 is replaced, the second door fixing unit 140 is released and the second door 220 is pulled out and opened.

Moreover, the first door 210 is fit into an opening 221 formed in the second door 220, such that the second door 220 surrounds the first door 210 on three sides thereof, except for the hinged side attached to the housing 110. When the second door 220 is closed with the first door 210 fitted into the opening 221 of the second door 220, the first door 210 and the second door 220 form the front side of the housing 110.

Figure 4A:
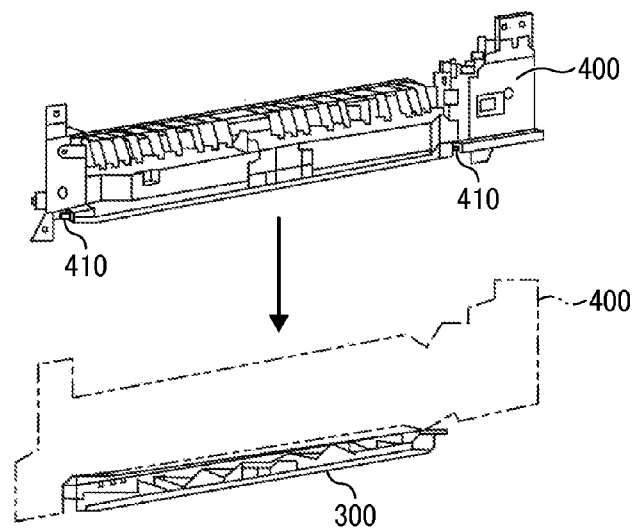
FIGS. 4A, 4B, and 4C are perspective views illustrating attachment of the first door and the second door of the image forming apparatus.
Figure 4B:
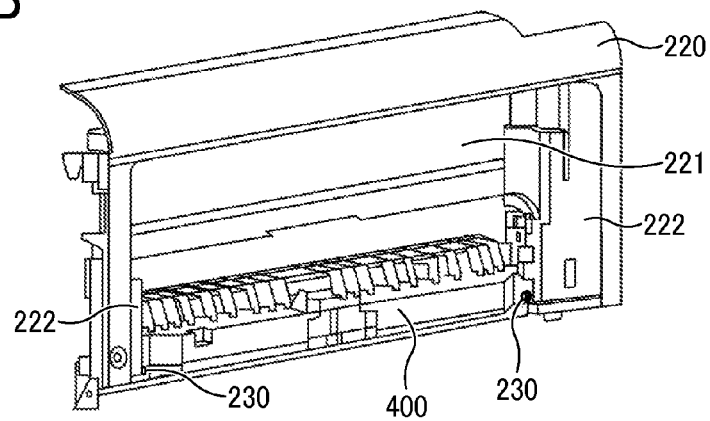
Figure 4C:
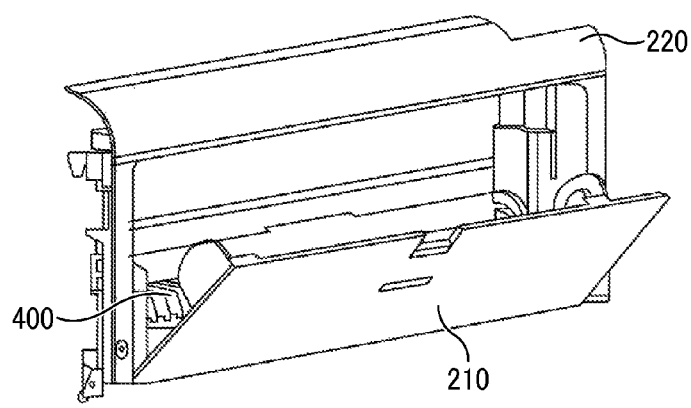

Next, attachment of the first door 210 and the second door 220 to the housing 110 is described. FIGS. 4A, 4B, and 4C are perspective views of a state in which the first door 210 and the second door 220 of the image forming apparatus 100 are opened together. In the image forming apparatus 100 according to the present exemplary embodiment, the housing 110 includes a pressing mechanism 300 disposed above the sheet feed tray 120. Moreover, as illustrated in FIG. 4A, a base member 400 is disposed above the pressing mechanism 300. The base member 400 includes two base shaft members 410 that rotatably hold the second door 220 in a lower portion thereof. The second door 220 is rotatably supported by the base shaft members 410 and held by the base member 400. This enables the second door 220 to be opened to the predetermined second angle $\theta 2$.

Moreover, as illustrated in FIG. 4B, the second door 220 includes two shaft members 230 that rotatably support the first door 210 from outer side in a lower portion thereof. The first door 210 is rotatably supported and held by the shaft members 230. The first door 210 can be independently opened to the predetermined first angle $\theta 1$.

A rotation preventing edge unit 222 is formed on the opening 221 of the second door 220. The rotation preventing edge unit 222 prevents the second door 220 from being opened over the first door 210 in a state that the first door 210 is fit into the opening 221. The base shaft members 410 and the shaft members 230 are linearly arranged to form a single shaft.

When the first door 210 is opened as illustrated in FIG. 2, the first door 210 rotates around the shaft members 230 serving as a hinge while the pressing mechanism 300 reduces impact. The rotation of the first door 210 stops at the first angle $\theta 1$. Herein, the first door 210 is fully opened and maintained as is without being pushed back by the pressing mechanism 300.

As illustrated in FIG. 3, when the first door 210 and the second door 220 are opened at the same time, the second door 220 rotates around the base shaft members 410 serving as a hinge and is opened to the second angle $\theta 2$. Herein, the first door 210 contacts the pressing mechanism 300, so that the pressing mechanism 300 reduces impact of the first door 210 and the second door 220. The second angle θ2 is greater than the first angle θ1 that is a maximum angle at which the first door 210 can be independently opened.

Figure 5A:
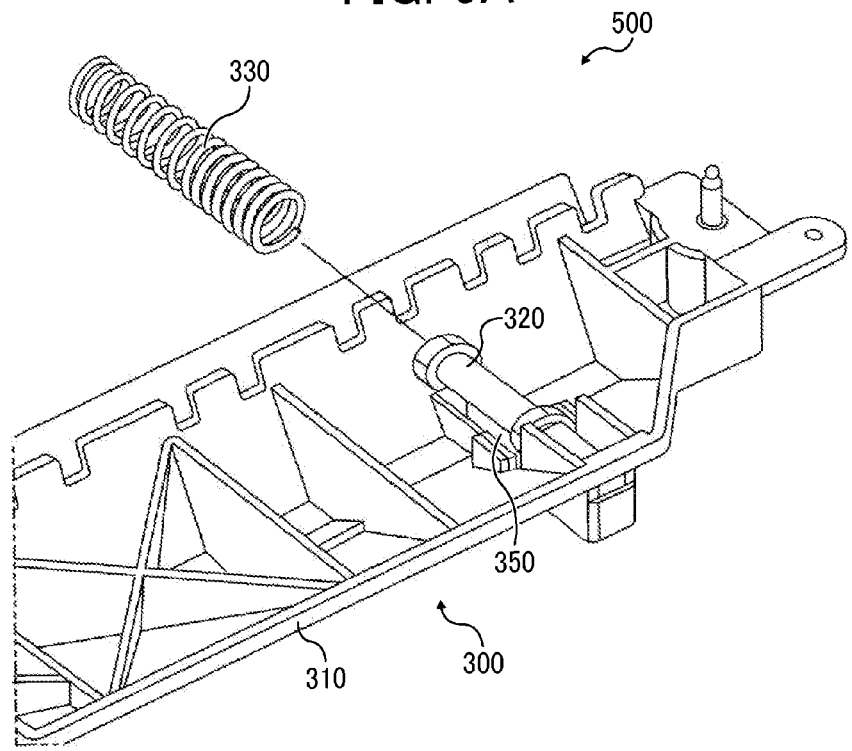
FIGS. 5A and 5B are perspective views of an impact reduction device.
Figure 5B:
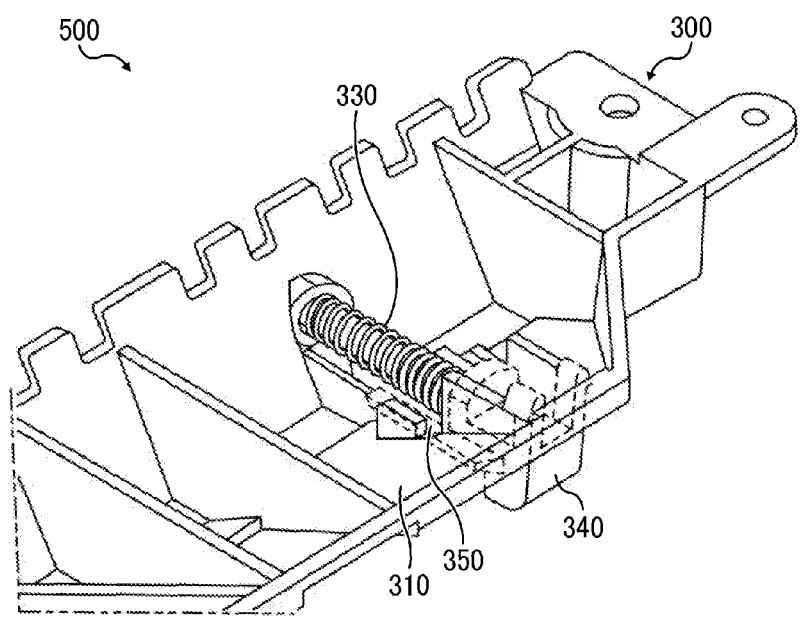
Figure 6A:
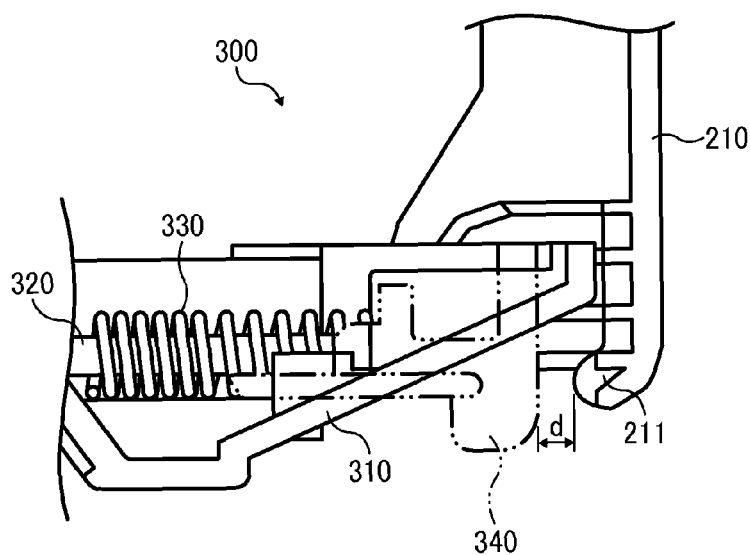
FIGS. 6A and 6B are sectional views of operation of the impact reduction device.
Figure 6B:
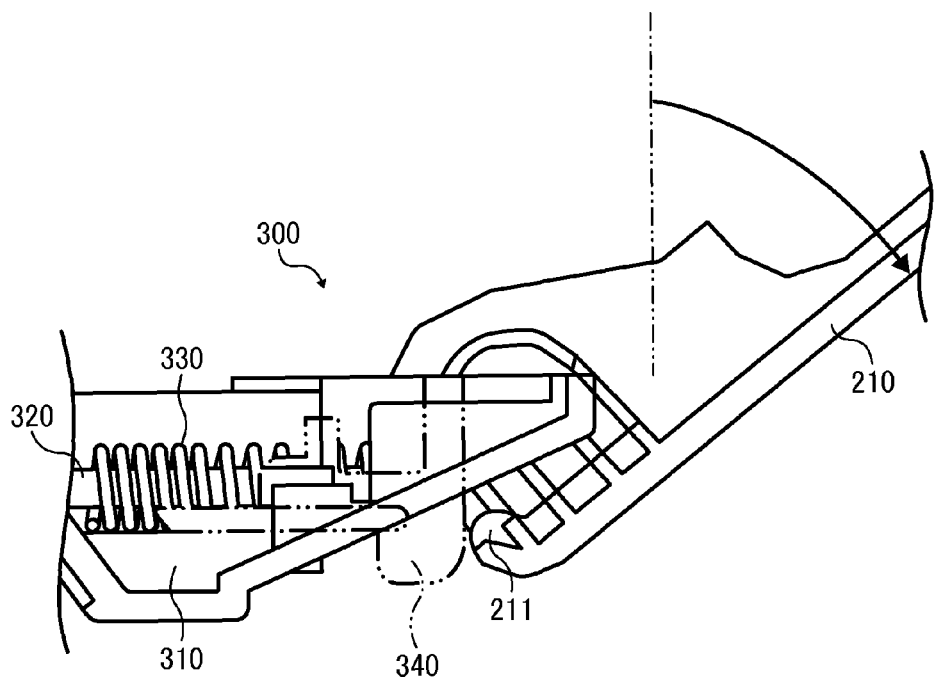

Next, the pressing mechanism 300 is described. FIGS. 5A and 5B are perspective views of the impact reduction device 500, and FIGS. 6A and 6B are sectional views of operation of the impact reduction device 500. The pressing mechanism 300, between the first door 210 and the housing 110, presses the first door 210 in a closing direction. Particularly, the pressing mechanism 300 presses the first door 210 in a direction in which the first door 210 is closed (in a direction in which the first door 210 returns to the initial state) by using a predetermined first force F1 until the first angle θ1 is reached. The first force F1 changes according to an angle of the first door 210. Moreover, the first force F1 is smaller than a force that can prevent the first door 210 from being opened under its own weight. Accordingly, when the first door 210 is opened at a certain angle by releasing the first door fixing unit 150, the first door 210 swings open under its own weight.

Moreover, the pressing mechanism 300 presses the second door 220 integrated with the first door 210 in a direction in which the first door 210 and the second door 220 are closed (in direction in which the first door 210 and the second door 220 return to the initial state). The second door 220 integrated with the first door 210 is pressed between the first angle θ1 and the second angle θ2 by using a second force F2 that is greater than the first force F1. The second force F2 changes according to an angle of the first door 210 and the second door 220. Moreover, the second force F2 is smaller than a force that can prevent the first door 210 and the second door 220 from being opened under its own weight. Thus, when the second door 220 with the first door 210 is opened at a certain angle by releasing the second door fixing unit 140, the second door 220 swings open under its own weight.

Thereby, the single pressing mechanism 300 can reduce impact of the first door 210 and impact of the second door 220 integrated with the first door 210.

As illustrated in FIGS. 5A and 5B, the pressing mechanism 300 includes a base 310 that is disposed on a front surface of the housing 110 and an upper portion of an opening of the sheet feed tray 120. Moreover, the base 310 includes a coil spring 330 that generates the first force F1 and the second force F2 by compression. The base 310 has two locations at which a coil spring 330 is disposed. On the coil spring 330, a pressing member 340 is disposed. A contact unit 211 of the first door 210 contacts the pressing member 340, so that the pressing member 340 presses the coil spring 330. The coil spring 330 is inserted into a spring holding member 320 disposed on the base 310, and then is attached to the spring holding member 320. Moreover, the pressing member 340 is disposed on a slide attachment unit 350 of the spring holding member 320 while being in contact with the coil spring 330.

FIGS. 6A and 6B are sectional views of operation of the impact reduction device 500. The pressing member 340 is disposed inside and away from the shaft members 230 and the base shaft members 410. Therefore, when the first door 210 is opened as illustrated in FIG. 6B from an initial state illustrated in FIG. 6A, the contact unit 211 disposed in a lower end of the first door 210 contacts and presses the pressing member 340. This enables the pressing member 340 to compress the coil spring 330. When the first door 210 is in the initial state, that is, the first door 210 is closed, the opening 221 and the pressing member 340 are separated with a distance d (see FIG. 6A) therebetween.

Figure 7:
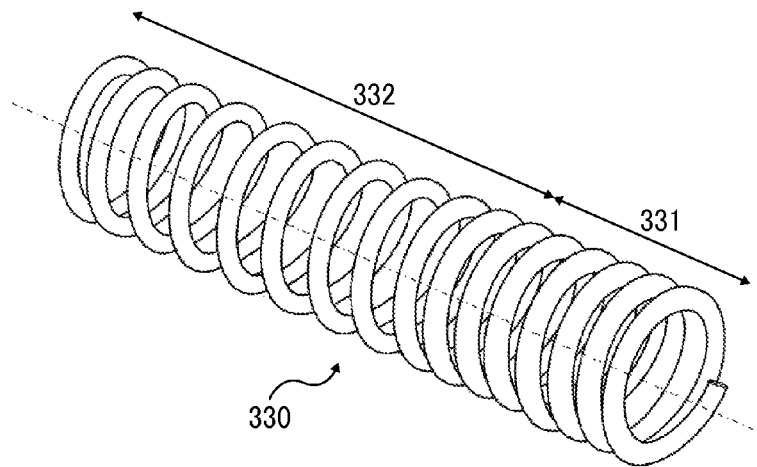
FIG. 7 is a perspective view of a coil spring used in the impact reduction device.

Next, the coil spring 330 is described. FIG. 7 is a perspective view of the coil spring 330 used in the impact reduction device 500. The coil spring 330 is a variable-pitch compression coil spring. The coil spring 330 includes a small pitch area 331 and a large pitch area 332, and has a non-linear characteristic. When the coil spring 330 is compressed, the coil spring 330 in the small pitch area 331 is closely wound and then the large pitch area 332 is compressed. Hence, spring loads can vary before and after the coil spring 330 in the small pitch area 331 is closely wound, thereby providing two different spring loads.

In a case where the pressing member 340 is pressed while the first door 210 is being independently opened at the maximum angle, the small pitch area 331 and the large pitch area 332 of the coil spring 330 are compressed. This generates a pressing force (a first force F1). The pressing force (the first force F1) to be generated is smaller than a load of the first door 210. This prevents a case where the first door 210 is not fully opened and a case where the first door 210 is pushed back by the pressing mechanism 300 after being opened.

Moreover, when the first door 210 is integrated with the second door 220 and such a second door 220 is opened, the first door 210 rotates to push the pressing member 340 and the impact is reduced by the coil spring 330. A pressing force (a second force F2) of the coil spring 330 is smaller than a load necessary to support the first door 210 and the second door 220 if an angle of the first door 210 exceeds the first angle θ1. This arrangement prevents a case where the first door 210 and the second door 220 are not fully opened, and a case where the second door 220 integrated with the first door 210 is pushed back by the pressing mechanism 300 after being opened.

Figure 8:
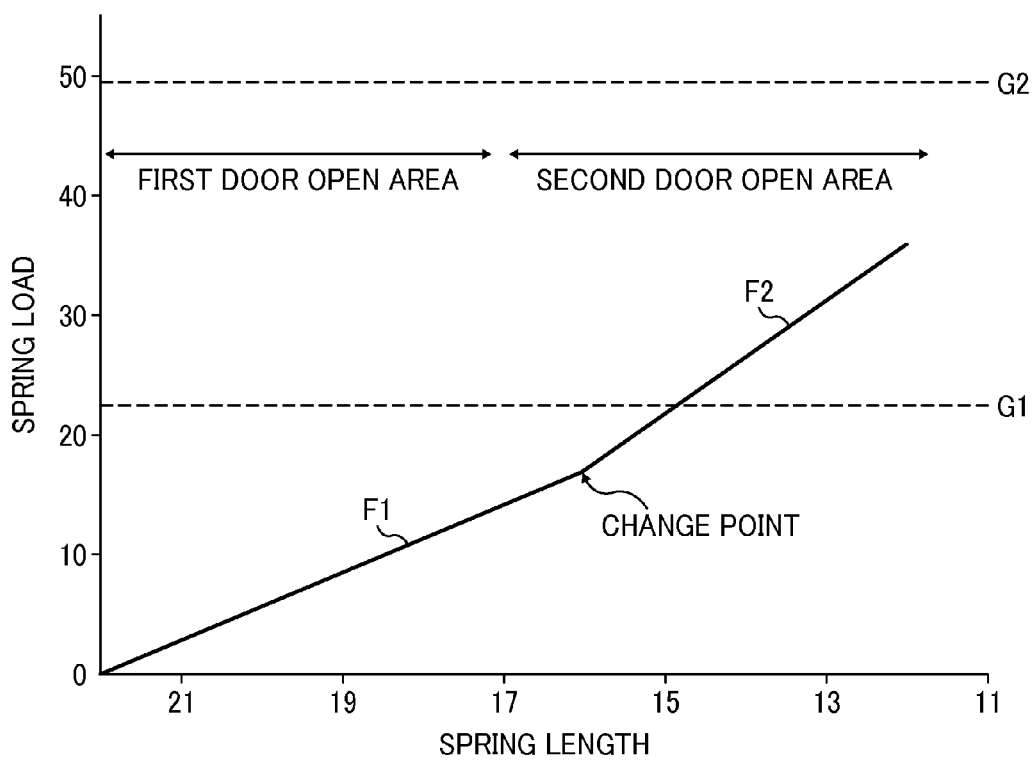
FIG. 8 is a graph of a relation between a length and a repulsive force of the coil spring.

FIG. 8 illustrates a relation between a length and a repulsive force of the coil spring 330. A relation between a spring load and a spring length of the coil spring 330 serving as a variable-pitch compression coil spring is described. In a first door open area illustrated in FIG. 8, the first door 210 is independently opened to the maximum angle (the first angle θ1). In such a case, both of the small pitch area 331 and the large pitch area 332 of the coil spring 330 are compressed, thereby generating a pressing force.

Such a pressing force (the first force F1) to be generated is smaller than a load G1 that is necessary to support the first door 210. This prevents a case where the first door 210 is not fully opened and a case where the first door 210 is pushed back by the pressing mechanism 300 after being opened.

In a second door open area illustrated in FIG. 8, the first door 210 and the second door 220 are opened together between the first angle θ1 and the second angle θ2. In such a case, the coil spring 330 in the small pitch area 331 is closely wounded, and only the large pitch area 332 is deformed. Thus, a withstanding load is increased at a change point at which the coil spring 330 in the small pitch area 331 becomes closely wounded. The pressing force (the second force F2) to be generated is smaller than a load G2 that is necessary to support both of the first door 210 and the second door 220. This prevents a case where the first door 210 and the second door 220 are not fully opened and a case where the second door 220 integrated with the first door 210 is pushed back after being opened.

According to the present exemplary embodiment, therefore, a signal impact reduction device can reduce impact generated when two members independently rotatable around a common shaft are opened. This can save space, and reduce costs, a product weight, and the number of components. Moreover, since the pressing mechanism includes a variable-pitch compression coil spring, structure of the impact reduction device can be simplified.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. An impact reduction device comprising:
   an open-close device including a first member configured to independently rotate around a shaft from an initial state to a predetermined first angle with respect to a housing and a second member capable of rotating together with the first member around the shaft from the initial state to a second angle greater than the first angle with respect to the housing; and
   a pressing mechanism disposed in the open-close device to press the first member in a direction in which the first member returns to the initial state when the first member is in an open state,
   the pressing mechanism pressing the first member in the direction in which the first member returns to the initial state using a predetermined first force until the first angle is reached,
   the pressing mechanism pressing the first member in a direction in which the first member together with the second member returns to the initial state using a second force greater than the first force between the first angle and the second angle, wherein the pressing mechanism has a non-linear characteristic in which the pressing mechanism presses the first member using a force smaller than that necessary to support a load of the first member until the first angle is reached as the first member is being opened, and presses the first member using a force smaller than that necessary to support a load of the first member and the second member between the first angle and the second angle.

2. The impact reduction device according to claim 1, wherein the pressing mechanism includes a variable-pitch compression coil spring.

3. The impact reduction device according to claim 2, wherein a change point of a spring load of the variable-pitch compression coil spring is a point at which the first member is opened at an angle greater than the first angle.

4. An image forming apparatus comprising:
   a housing;
   an image formation unit disposed in the housing to form an image on a recording medium; and
   the impact reduction device of claim 1.

* * * * *